(12) United States Patent
Hahn et al.

(10) Patent No.: US 8,783,300 B2
(45) Date of Patent: Jul. 22, 2014

(54) HOSE ASSEMBLY AND METHOD OF FORMING THE SAME

(75) Inventors: Rich Hahn, Ortonville, MI (US); Scott Kowalczyk, Fairport Harbor, OH (US); Norman S. Martucci, Clarkston, MI (US)

(73) Assignee: Kongsberg Actuation Systems II, Inc., Suffield, CT (US)

( * ) Notice: Subject to any disclaimer, the term of this patent is extended or adjusted under 35 U.S.C. 154(b) by 894 days.

(21) Appl. No.: 12/857,276

(22) Filed: Aug. 16, 2010

(65) Prior Publication Data

US 2011/0036442 A1    Feb. 17, 2011

Related U.S. Application Data

(60) Provisional application No. 61/234,149, filed on Aug. 14, 2009.

(51) Int. Cl.
*F16L 11/00*    (2006.01)

(52) U.S. Cl.
USPC ............ 138/125; 138/126; 138/130; 138/144

(58) Field of Classification Search
USPC .................. 138/126, 130, 125, 127, 141, 144
See application file for complete search history.

(56) References Cited

U.S. PATENT DOCUMENTS

| | | | |
|---|---|---|---|
| 3,750,712 A | | 8/1973 | Brand |
| 4,190,088 A | * | 2/1980 | Lalikos et al. ................ 138/126 |
| 4,259,989 A | * | 4/1981 | Lalikos et al. ................ 138/109 |
| 4,326,905 A | | 4/1982 | Tanaka |
| 4,384,595 A | * | 5/1983 | Washkewicz et al. ........ 138/127 |
| 4,447,378 A | * | 5/1984 | Gray et al. .................... 264/45.9 |
| 4,668,318 A | | 5/1987 | Piccoli et al. |
| 4,954,388 A | | 9/1990 | Mallouk et al. |
| 5,124,878 A | | 6/1992 | Martucci |
| 5,142,782 A | | 9/1992 | Martucci |
| 5,192,476 A | | 3/1993 | Green |

(Continued)

FOREIGN PATENT DOCUMENTS

| EP | 0148100 B1 | 7/1985 |
|---|---|---|
| EP | 0148834 B1 | 5/1989 |

(Continued)

OTHER PUBLICATIONS

English language abstract for EP0953795, extracted from espacenet on Dec. 15, 2010, 1 page.

(Continued)

*Primary Examiner* — Patrick F Brinson
(74) *Attorney, Agent, or Firm* — Howard & Howard Attorneys PLLC (57) ABSTRACT

A hose assembly and a method for forming the hose assembly are disclosed. The hose assembly includes a core tube having an outer peripheral surface and is formed from a fluoropolymer. The hose assembly also includes a first reinforcing layer disposed about the core tube and defining a plurality of first apertures, and a second reinforcing layer disposed about the first reinforcing layer and having an exterior surface and defining a plurality of second apertures. The hose assembly further includes a polymeric binder, formed from a binder composition, on the outer peripheral surface of the core tube, in the first and second apertures, and about the exterior surface of the second reinforcing layer to bond the first and second reinforcing layers to the core tube.

12 Claims, 4 Drawing Sheets

(56) References Cited

U.S. PATENT DOCUMENTS

| | | |
|---|---|---|
| 5,381,834 A | 1/1995 | King |
| 5,655,572 A | 8/1997 | Marena |
| 5,974,649 A | 11/1999 | Marena |
| 6,024,133 A | 2/2000 | Kodama et al. |
| 6,039,084 A | 3/2000 | Martucci et al. |
| 6,089,277 A | 7/2000 | Kodama et al. |
| 6,109,306 A | 8/2000 | Kleinert |
| 6,220,304 B1 | 4/2001 | Horiba et al. |
| 6,257,280 B1 | 7/2001 | Marena |
| 6,302,150 B1 | 10/2001 | Martucci et al. |
| 6,677,018 B1 | 1/2004 | Satoh |
| 6,679,297 B1 | 1/2004 | Nishi et al. |
| 6,695,015 B1 | 2/2004 | Ono et al. |
| 6,849,314 B2 | 2/2005 | Jing et al. |
| 6,883,551 B2 | 4/2005 | Bourgois et al. |
| 6,926,038 B1 | 8/2005 | Cook et al. |
| 6,978,805 B2 | 12/2005 | D'Amico |
| 7,021,673 B2 | 4/2006 | Furuta et al. |
| 7,114,526 B2 * | 10/2006 | Takagi et al. ............ 138/127 |
| 7,222,644 B2 | 5/2007 | Pianetto et al. |
| 7,328,725 B2 | 2/2008 | Henry et al. |
| 2001/0018933 A1 | 9/2001 | Martucci et al. |
| 2002/0056511 A1 | 5/2002 | Mathew et al. |
| 2003/0129336 A1 | 7/2003 | Bourgois et al. |
| 2005/0051226 A1 | 3/2005 | D'Amico |
| 2005/0056962 A1 | 3/2005 | Martucci |
| 2005/0121095 A1 * | 6/2005 | Ono et al. ............ 138/126 |
| 2006/0191586 A1 | 8/2006 | Cheng |
| 2007/0181202 A1 * | 8/2007 | Polasky ............ 138/126 |
| 2008/0017266 A1 | 1/2008 | Doshi et al. |
| 2008/0029178 A1 | 2/2008 | Bentley |
| 2008/0185063 A1 | 8/2008 | Bieszczad et al. |
| 2008/0210328 A1 | 9/2008 | Henry |
| 2008/0230136 A1 | 9/2008 | Sakazaki et al. |
| 2008/0236696 A1 | 10/2008 | Fukaya et al. |
| 2008/0298788 A1 | 12/2008 | Martucci et al. |

FOREIGN PATENT DOCUMENTS

| | | |
|---|---|---|
| EP | 0380841 B1 | 8/1990 |
| EP | 0953795 B1 | 11/1999 |
| EP | 1127680 B1 | 5/2002 |
| EP | 1295061 B1 | 4/2006 |
| JP | 53046339 A | 4/1978 |
| JP | 01063125 A | 3/1989 |
| WO | 01/92770 A1 | 12/2001 |
| WO | 01/92771 A1 | 12/2001 |
| WO | 2013/165452 A1 | 11/2013 |
| WO | 2013/165453 A1 | 11/2013 |

OTHER PUBLICATIONS

English language abstract for JP01063125, extracted from espacenet on Dec. 15, 2010, 1 page.
English language abstract for JP53046339, extracted from espacenet on Dec. 15, 2010, 1 page.

* cited by examiner

HOSE ASSEMBLY AND METHOD OF FORMING THE SAME

CROSS REFERENCE TO RELATED APPLICATION

This application claims the benefit of U.S. Provisional Patent Application Ser. No. 61/234,149, filed on Aug. 14, 2009, the disclosure of which is hereby incorporated by reference.

FIELD OF THE INVENTION

The present invention generally relates to a hose assembly for conveying fluids and a method of forming the hose assembly.

BACKGROUND

Hose assemblies for conveying fuel and other corrosive fluids are well known in the art. These types of hose assemblies are exposed to a variety of fuel mixtures, fuel additives, and chemicals in addition to being exposed to extreme pressures, temperatures, and environmental conditions. Further, these hose assemblies are subjected to physical stresses, such as bending, repeated movement, and forces. Accordingly, these hose assemblies should be resistant to chemical and physical degradation.

These types of hose assemblies typically include a hose formed from fluoropolymers, such as polytetrafluoroethylene. Fluoropolymers are utilized for many hose applications. However, fluoropolymers have relatively low tensile strength, which can cause hose assemblies including hoses formed from fluoropolymers to have low hoop strength and, consequently, can be susceptible to kinking and other problems.

As such, these hose assemblies have been designed to provide additional strength, durability, and kink resistance to a hose comprising fluoropolymers. For example, hose assemblies including hoses having a plurality of convolutions can be used to increase the strength, durability, and kink resistance of the hose assemblies. However, hoses having a plurality of convolutions can cause fluidic turbulence. As another example, a spring guard can be included in hose assemblies to provide additional strength, durability, and kink resistance to hoses comprising fluoropolymers; however, the spring guard increases the cost of manufacturing.

In addition, hose assemblies can include one or more reinforcing layers to provide additional strength, durability, and kink resistance. Typically, as a number of the reinforcing layers increase, strength, durability, and kink resistance of the hose assembly increases. However, increasing the number of the reinforcing layers reduces flexibility of the hose assembly such that a bend radius of these hose assemblies is limited.

Also, as the number of the reinforcing layers increase, a method of forming such hose assemblies typically becomes increasingly complex and costly. As each individual reinforcing layer is added, an emulsion composition or a tie layer is typically required to bond the individual reinforcing layers together. As such, the method typically includes many complicated steps and precludes use of additional reinforcing layers without additional applications of the emulsion composition or tie layers. Also, the emulsion composition can fail to facilitate consistent wetting of the hose and the reinforcing layers, which consequently can cause the hose to delaminate from the reinforcing layers, which, in turn, can cause the hose to kink or even tear.

As such, there remains an opportunity to develop a hose assembly and a method of forming the hose assembly, which resistant to kinking, while possessing increased flexibility and bending properties.

SUMMARY OF THE INVENTION AND ADVANTAGES

The present invention provides a hose assembly including a core tube having an outer peripheral surface and is formed from a fluoropolymer. The hose assembly also includes a first reinforcing layer disposed about the core tube and defining a plurality of first apertures. The hose assembly also includes a second reinforcing layer disposed about the first reinforcing layer. The second reinforcing layer has an exterior surface and defines a plurality of second apertures. The hose assembly further includes a polymeric binder on the outer peripheral surface of the core tube, in the first and second apertures, and about the exterior surface of the second reinforcing layer to bond the first and second reinforcing layers to the core tube to form the hose assembly.

The present invention also provides a method for forming the hose assembly. The method includes the steps of extruding the fluoropolymer to form the core tube having the outer peripheral surface and comprising the fluoropolymer, disposing the first reinforcing layer about the core tube to define the first apertures, and disposing the second reinforcing layer about the first reinforcing layer to define the second apertures. The method also includes the steps of applying a binder composition to the exterior surface of the second reinforcing layer after the second reinforcing layer is disposed about the first reinforcing layer, infusing the binder composition through the second apertures to contact the first reinforcing layer, infusing the binder composition through the first apertures to contact the outer peripheral surface of the core tube, and heating the binder composition to form the polymeric binder on the outer peripheral surface of the core tube, in the first and second apertures, and about the exterior surface of the second reinforcing layer to bond the first and second reinforcing layers to the core tube to form the hose assembly.

Accordingly, the hose assembly includes multiple reinforcing layers and is chemically and physically resistant to extreme pressures, temperatures, and environmental conditions. In addition, the hose assembly is strong and durable, e.g., resistant to kinking, while possessing increased flexibility and bending properties. The first and the second reinforcing layers as well as the binder composition and the polymeric binder formed therefrom facilitate a simplified and cost-effective method, requiring fewer steps and less materials, for forming the hose assembly.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION OF THE INVENTION

Figures 1, 1A, 1B, 2A:
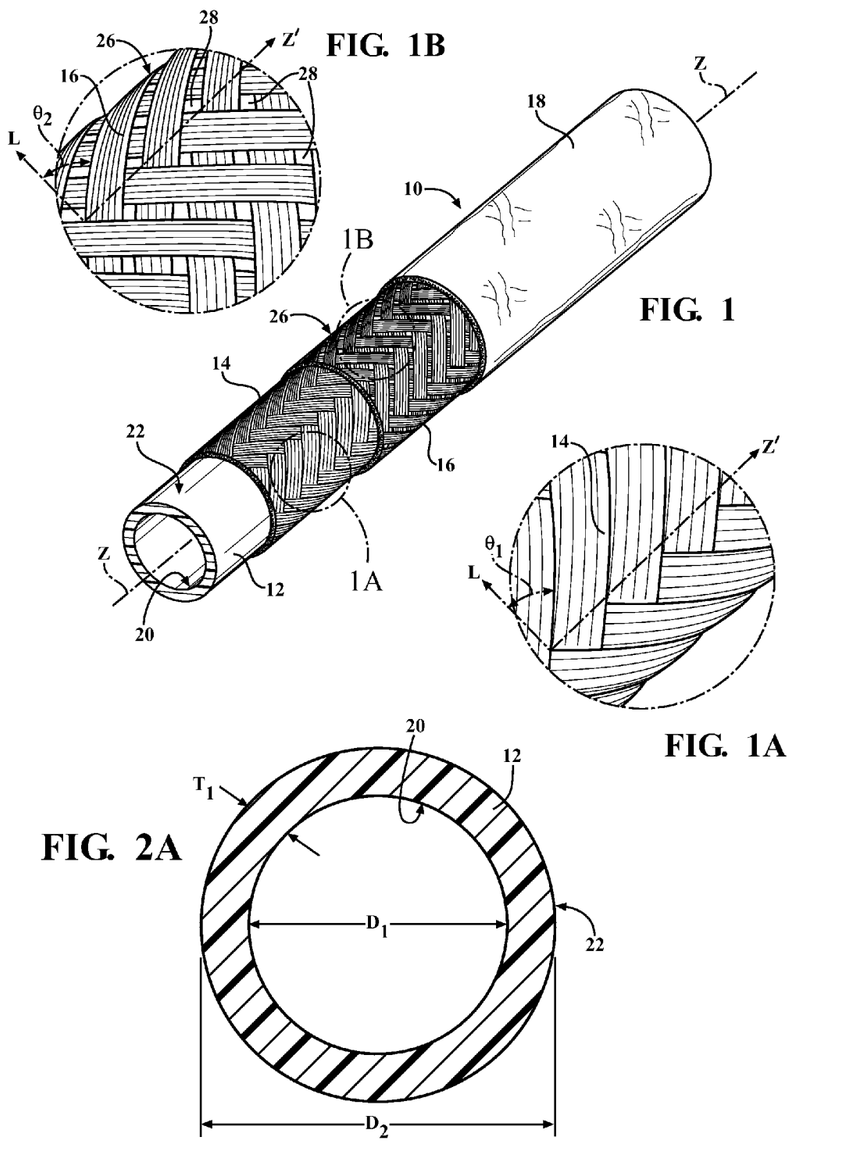
FIG. 1 is a partial cross-sectional perspective view of a hose assembly including a core tube, a first reinforcing layer, a second reinforcing layer, and a polymeric binder.
FIG. 1A is an enlarged perspective view of the first reinforcing layer taken from FIG. 1.
FIG. 1B is an enlarged perspective view of the second reinforcing taken from FIG. 1.
FIG. 2A is a cross-sectional view of the core tube.
Figure 2B:
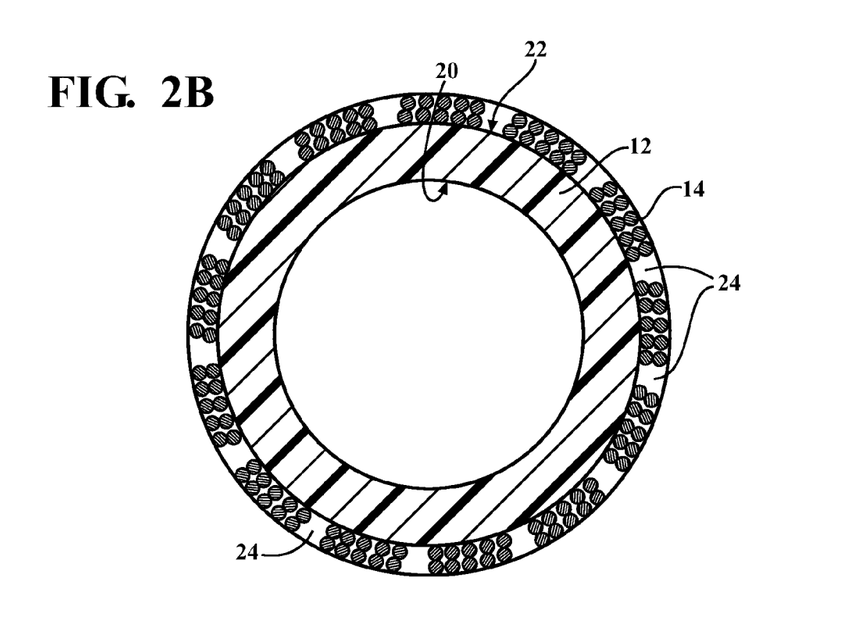
FIG. 2B is a cross-sectional view of the first reinforcing layer defining a plurality of first apertures disposed about the core tube.
Figure 2C:
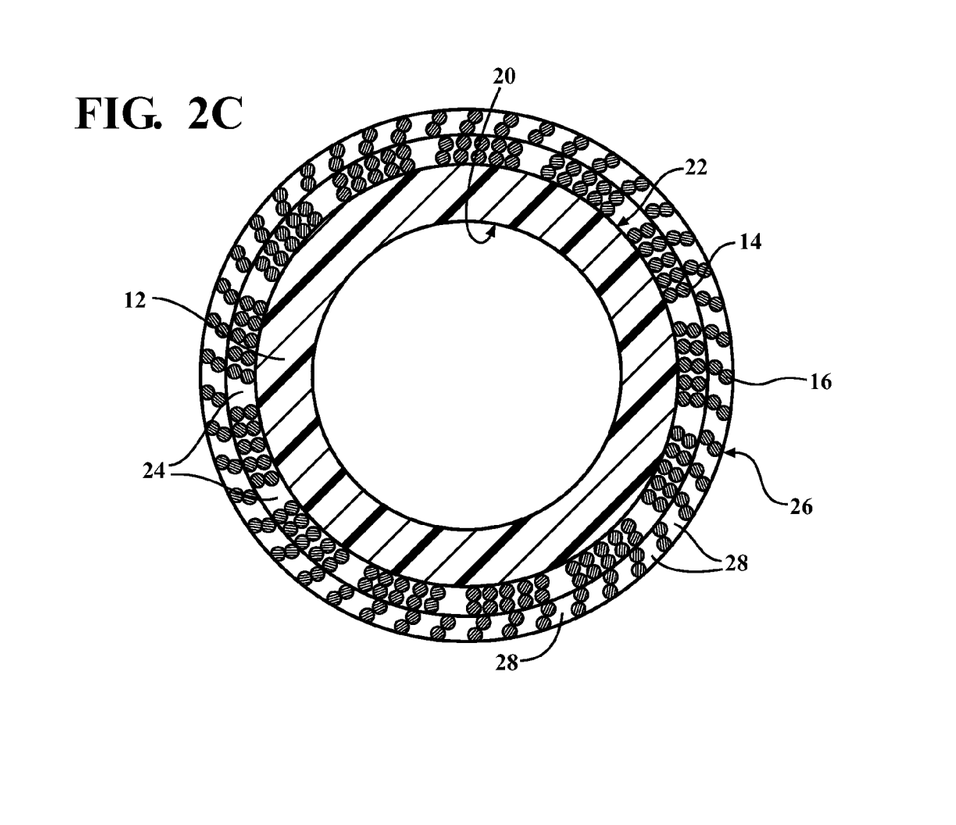
FIG. 2C is a cross-sectional view of the second reinforcing layer defining a plurality of second apertures disposed about the first reinforcing layer.
Figure 2D:
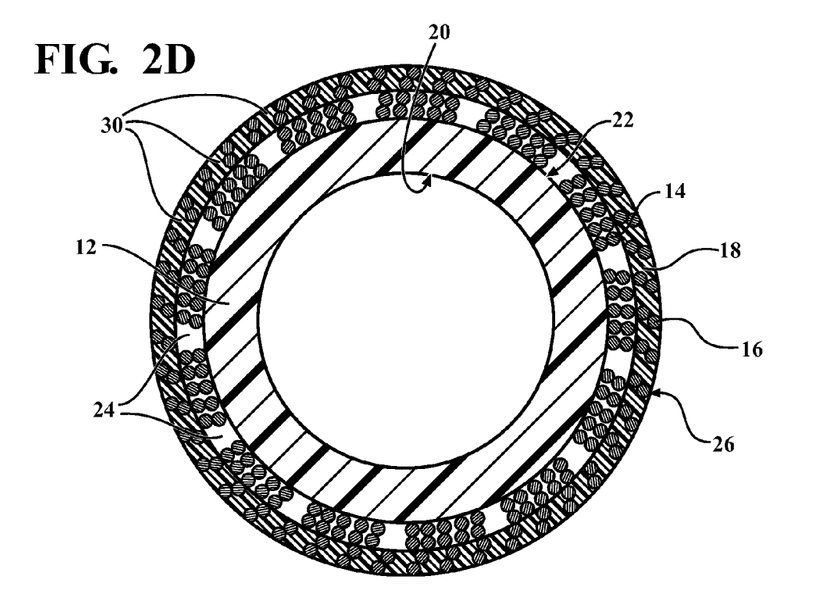
FIG. 2D is a cross-sectional view of a binder composition infused through the second apertures of the second reinforcing layer and contacting the first reinforcing layer.
Figure 2E:
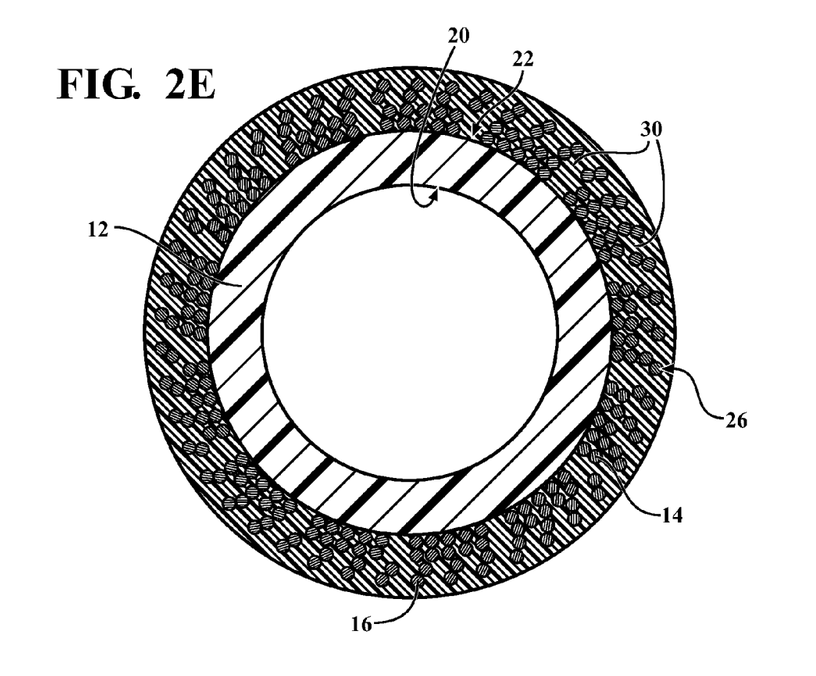
FIG. 2E is a cross-sectional view of the binder composition infused through the first and second apertures of the first and second reinforcing layers with the binder composition contacting an outer peripheral surface of the core tube.
Figure 2F:
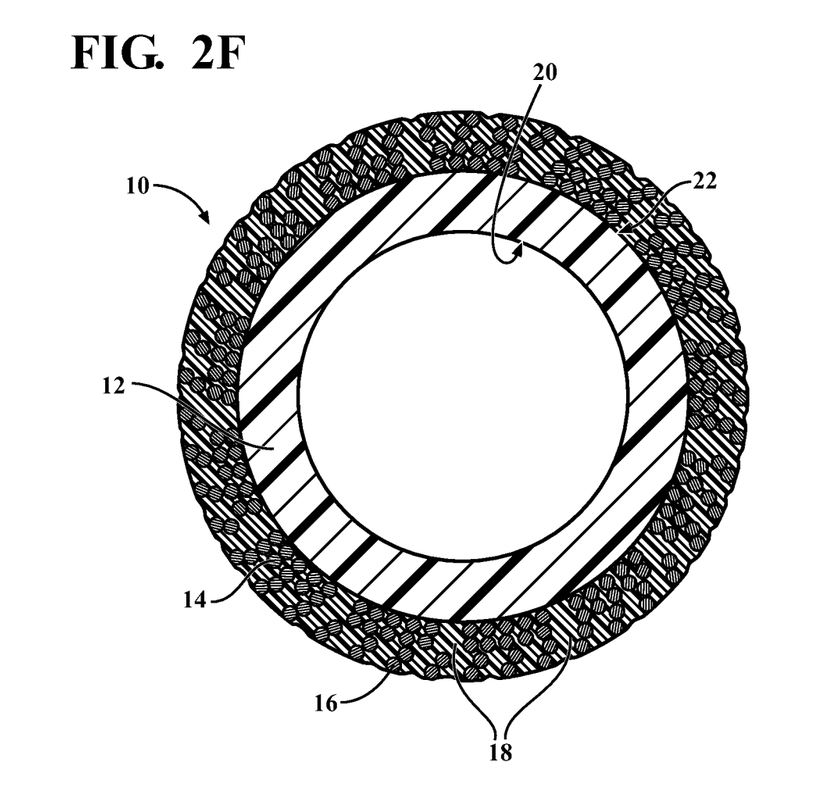
FIG. 2F is a cross-sectional view of the binder composition cured to form the hose assembly including the core tube, the first reinforcing layer, the second reinforcing layer, and the polymeric binder.

Referring to the Figures wherein like numerals indicate like or corresponding parts throughout the several views a hose assembly 10 is generally shown in FIGS. 1 and 2F. The hose assembly 10 is typically used for conveying fluids, such as fuels, chemicals, etc. The hose assembly 10 is particularly suitable for use in the transportation industry, e.g., in vehicles; however, it is to be appreciated that the hose assembly 10 is not limited to the transportation industry. For example, the hose assembly 10 can be utilized in the chemical industry, the food industry, and any other suitable industry.

Referring to FIGS. 1 and 2A, the hose assembly includes a core tube 12 defining a tubular configuration along a first axis Z. The core tube 12 has an inner peripheral surface 20 and an outer peripheral surface 22 opposing the inner peripheral surface 20. The core tube 12 typically has a thickness $T_1$ of from about 5 to about 60, more typically from about 15 to about 30, and most typically from about 17 to about 25, mil. The core tube 12 is typically free from voids, gaps, cells, and other physical defects. The inner peripheral surface 20 is typically smooth and free of undulations and seams that can cause turbulence for the fluid flowing through the core tube 12. Turbulence can decrease the flow rate of the fluid flowing through the core tube 12 and create backpressure in the hose assembly 10. In addition, turbulence can cause build-up of electrical charge within the hose assembly 10, which is particularly undesirable when potentially flammable fluid, such as fuel, is transported through the hose assembly 10.

The core tube 12 has an inner diameter $D_1$. For example, the hose assembly 10 can have the inner diameter $D_1$ of two inches for use in applications that require transfer of greater volumes of fluid or the inner diameter $D_1$ of a half of an inch for use in applications that require transfer of lesser volumes of fluid. The inner diameter $D_1$ can be any diameter depending on the intended use of the hose assembly 10.

The core tube 12 includes a polymer which is typically is resistant to chemical, physical, and environmental, e.g., thermal, degradation. As such, when fluid, such as fuel, passes through the core tube 12, the polymer is resistant to physical or chemical corrosion or degradation. The polymer also typically minimizes the permeation rate of gas and/or liquids through core tube 12. The core tube 12 can include more than one polymer. The core tube 12 can include any suitable polymer or mixtures of polymers known in the art. Typically, the polymer is a fluoropolymer. Suitable fluoropolymers include, but are not limited to, polytetrafluoroethylene (PTFE), ethylene tetrafluoroethylene (ETFE), fluorinated ethylenepropylene (FEP), polyvinylidine fluoride (PVDF), perfluoroalkoxy fluorocarbons (PFA), and polychlorotrifluoroethylene (PCTFE). In certain embodiments, the first polymeric material is polytetrafluoroethylene sold under the trade name TEFLON® T62 and commercially available from DuPont of Wilmington, Del. TEFLON® T62 has a gel temperature of about 612° F.

The core tube 12 can also include an integral conductor along a length of the core tube 12 for preventing build up of electrical charge as discussed above. In other words, the integral conductor is co-extensive with the length of the core tube 12 for conducting and dissipating the electrical charges that can build up along the length of the core tube 12. The integral conductor can be any integral conductor known in the art.

Referring now to FIGS. 1, 1A, and 2B, the hose assembly 10 further includes a first reinforcing layer 14 for increasing the strength, durability, and bending properties of the hose assembly 10. The first reinforcing layer 14 is disposed about the core tube 12. The first reinforcing layer 14 defines a plurality of first apertures 24 spaced from each other. Typically the first reinforcing layer 14 covers greater than about 90, more typically greater than about 95, and most typically greater than about 99, % of the outer peripheral surface 22 of the core tube 12.

Typically, the first reinforcing layer 14 comprises a fiber. It is to be appreciated that fiber can be further defined as fibers. The fibers can comprise any material known to those skilled in the art. Typically, the fibers comprise a polymer, a fiberglass, a metal, or combinations thereof. In one embodiment, the fibers comprise fiberglass. Fiberglass provides strength to reinforce the core tube 12 and is thermally stable at elevated temperatures which is beneficial for use in high temperature environments, e.g., under a hood of vehicles.

The fibers can be monofilament fiber or multifilament fibers. The fibers are typically intertwined or woven about the core tube 12 in a braided configuration. More specifically, the fibers are typically intertwined or woven about the core tube 12 at a braid angle θ. In other words, the fibers are braided into braids that are woven about the core tube 12 at the braid angle θ. The braid angle θ is the angle of the braid to a second axis L, which is spaced from and substantially perpendicular to the first axis Z. In FIGS. 1A and 1B, a third axis Z', which is spaced from and substantially parallel to the first axis Z, is included for reference. The first reinforcing layer 14 has a first braid angle $θ_1$. The first braid angle $θ_1$ and an effective fiber diameter define a configuration of the first apertures 24. The configuration of the first apertures 24 determines the percent of the outer peripheral surface 22 of the core tube 12 which is covered by the first reinforcing layer 14, and reduces movement of the core tube 12, both longitudinally and diametrically, when internal pressure is applied to the core tube 12. The first braid angle $θ_1$ is typically of from about 54 to about 60, more typically from about 54.7 to about 57, and most typically from about 55 to about 56, degrees.

The fibers of the first reinforcing layer 14 are typically intertwined or woven about the core tube 12 at a pitch, i.e., the fibers are braided into braids that are woven about the core tube 12 at the pitch. The pitch is the amount of revolutions, or pics, around the outer peripheral surface 22 of the core tube 12 over a length of the core tube 12. As such, the pitch can be measured in pics per 5 inches. The pitch of the first reinforcing layer 14 is dependent on the effective fiber diameter and an outer diameter $D_2$ of the core tube 12.

Referring now to FIGS. 1, 1B, and 2C, the hose assembly 10 further includes a second reinforcing layer 16 for increasing the strength, durability, and bending properties of the hose assembly 10. The second reinforcing layer 16 is disposed about the first reinforcing layer 14 and has an exterior surface 26. The second reinforcing layer 16 defines a plurality of second apertures 28 spaced from each other. Typically the second reinforcing layer 16 covers of from about 40 to about 90, more typically from about 60 to about 85, and most typically from about 70 to about 80, % of the first reinforcing layer 14.

Typically, the second reinforcing layer 16 comprises fibers. The fibers can comprise any material known to those skilled in the art. Typically, the fibers comprise a polymer, a fiberglass, a metal, or combinations thereof. In one embodiment, the fibers comprise fiberglass. Fiberglass provides strength to reinforce the hose assembly 10. The fibers can be monofilament fibers or multifilament fibers. The fibers are typically intertwined or woven about the first reinforcing layer 14 in a braided configuration. More specifically, the fibers are typically intertwined or woven about the first reinforcing layer 14 at a second braid angle $\theta_2$. In other words, the fibers are braided into braids that are woven about the first reinforcing layer 14 at the second braid angle $\theta_2$. The second braid angle $\theta_2$ and the effective fiber diameter define a configuration of the second apertures 28. The configuration of the second apertures 28 determines the percent of the first reinforcing layer 14 which is covered by the second reinforcing layer 16, and reduces movement of the first reinforcing layer 14, both longitudinally and diametrically, when internal and external stress is applied to the hose assembly 10. The second braid angle $\theta_2$ of the second reinforcing layer 16 is typically of from about 45 to about 54.7, more typically from about 47 to about 54, and most typically from about 50 to about 53, degrees.

The fibers of the second reinforcing layer 16 are typically intertwined or woven about the first reinforcing layer 14 at the pitch, i.e., the fibers are braided into braids that are woven about the first reinforcing layer 14 at the pitch. The pitch of the second reinforcing layer 16 is dependent on the effective fiber diameter and the outer diameter $D_2$ of the core tube 12.

In a typical embodiment, the first braid angle $\theta_1$ is greater than the second braid angle $\theta_2$. When the first braid angle $\theta_1$ is different than the second braid angle $\theta_2$, mechanical properties of the hose assembly 10 are improved. That is, when fluidic pressure builds in the hose assembly 10, the inner diameter $D_1$ of core tube 12 increases, pushing the first reinforcing layer 14 against the second reinforcing layer 16 and enables the second reinforcing layer 16 to improve the mechanical properties, such as strength and kink resistance, of the hose assembly 10.

In addition the hose assembly 10 also includes a polymeric binder 18 formed from a binder composition 30. The binder composition 30 comprises a fluidic carrier, such as water, having one or more polymers dispersed therein. The binder composition 30 typically has a viscosity of from about 30 to about 100, more typically from about 40 to about 90, and most typically from about 50 to about 70, cps at 25° C. in accordance with ASTM D 1824. The binder composition 30 also typically has a percent solids of from about 35 to about 65, more typically from about 44 to about 63, and most typically from about 44 to about 62, % in accordance with ASTM D 4441.

The binder composition 30 typically includes a polymer that is resistant to chemical and thermal degradation and is also chemically compatible with, e.g., miscible with, the polymer of the core tube 12. Typically, the polymer is a halogenated polymer. More typically, the polymer is a fluoropolymer. Suitable fluoropolymers include, but are not limited to, polytetrafluoroethylene (PTFE), ethylene tetrafluoroethylene (ETFE), fluorinated ethylenepropylene (FEP), polyvinylidine fluoride (PVDF), perfluoroalkoxy fluorocarbons (PFA), and polychlorotrifluoroethylene (PCTFE). In certain embodiments, the first polymeric material is polytetrafluoroethylene sold under the trade name TEFLON® 3859 and commercially available from DuPont of Wilmington, Del.

The binder composition 30 can also include a surfactant. The surfactant promotes homogeneous and complete wet out of the binder composition 30 on the surfaces of various materials, such as fiberglass (for example, the fibers of the first and the second reinforcing layers 14, 16) and fluoropolymers (for example, the polymer of the core tube 12). The surfactant is typically a nonionic surfactant, such as an ethoxylate. Specific examples of suitable surfactants include, but are not limited to TERGITOL™ TMN series surfactants, commercially available from Dow Chemical of Midland, Mich. A particularly suitable surfactant is TERGITOL™ TMN-6, a branched secondary alcohol ethoxylate. If included, the surfactant can be included in the binder composition 30 in various amounts.

The binder composition 30 can also include one or more additives. Suitable additives include, but are not limited to, chain-extenders, cross-linkers, chain-terminators, processing additives, adhesion promoters, anti-oxidants, defoamers, blowing agents, flame retardants, catalysts, anti-foaming agents, water scavengers, molecular sieves, fumed silicas, ultraviolet light stabilizers, fillers, thixotropic agents, silicones, colorants, pigments, inert diluents, and combinations thereof. If included, the additives can be included in the binder composition 30 in various amounts.

The binder composition 30 is applied to a partially constructed hose assembly 10 and is typically passed through a preheated oven to remove the fluidic carrier and cure the polymer to form the polymeric binder 18, as is discussed in greater detail below. The polymeric binder 18 is on the outer peripheral surface 22 of the core tube 12, in the first and second apertures 28, and about the exterior surface 26 of the second reinforcing layer 16. The polymeric binder 18 bonds the first and second reinforcing layers 12, 14 to the core tube 12 to form the hose assembly 10. Functionally, the polymeric binder 18 bonds the core tube 12 to the first and second reinforcing layers 12, 14 to further seal and coat the hose assembly 10; thereby improving chemical resistance, thermal resistance, environmental resistance, durability, flexibility, hoop strength and kink resistance of the hose assembly 10.

The binder composition 30 comprises the polymer, which can be further cured or cross-linked to form the polymeric binder 18. The polymeric binder 18 typically comprises a fluoropolymer such as polytetrafluoroethylene. The polymeric binder 18 has a flexural modulus of from about 40 to about 170, more typically from about 45 to about 100, and most typically from about 50 to about 60, kpsi in accordance with ASTM D 790.

As previously stated, the core tube 12 and the polymeric binder 18 are typically fluoropolymers. It should be appreciated that the core tube 12 and the polymeric binder 18 can be formed from different fluoropolymers.

The hose assembly 10 can further include a coupling (not shown). Typically the coupling is adapted to engage at least one end of the hose assembly 10 for interconnecting the hose assembly 10 to a fluid source, such as fuel tanks. It is to be appreciated that any suitable coupling can be used with the hose assembly 10.

The present invention also provides a method of making the hose assembly. As set forth above, the hose assembly 10 includes the core tube 12 having the outer peripheral surface 22, the first reinforcing layer 14 defining the plurality of first apertures 24, the second reinforcing layer 16 having the exterior surface 26 and defining the plurality of second apertures 28, and the polymeric binder 18. All components, e.g., the first and second reinforcing layers 14, 16, the polymeric binder 18, etc., as described above can be used in the method of the subject invention.

First, the fluoropolymer is extruded to form the core tube 12 having the inner peripheral surface 20, which is smooth, and the outer peripheral surface 22, which is smooth or textured. One such core tube is as illustrated in FIG. 2A. The core tube 12 is typically extruded using melt, paste, or any other extrusion technique known in the art. After the core tube 12 is extruded, the method can optionally include the step of coating the outer peripheral surface 22 of the core tube 12 with the binder composition 30.

The method also includes the step of disposing the first reinforcing layer 14 about the core tube 12 to define the first apertures 24 and disposing the second reinforcing layer 16 about the first reinforcing layer 14 to define the second apertures 28. FIG. 2B illustrates the first reinforcing layer 14 disposed about the core tube 12 and the first apertures 24. FIG. 2C illustrates the second reinforcing layer 14 disposed about the first reinforcing layer 14 and the second apertures 28. The first and second reinforcing layers 12, 14 can be disposed about the core tube 12 and the first reinforcing layer 14 with any suitable braiding machine known in the art. The braiding machine typically includes a plurality of spools which carry fibers. Fibers are fed through the machine to a braiding area. In the braiding area, fibers are interwoven or wound about the core tube 12 to form the first and second reinforcing layers 14, 16. Alternatively, the first and the second reinforcing layers 14, 16 can be constructed in a pre-made, sock-like fashion and then disposed about the core tube 12. For example, the first and second reinforcing layers 14, 16 can be pre-made and tightened around the core tube 12.

The step of disposing the first reinforcing layer 14 about the core tube 12 can be further defined as covering a certain percentage of the outer peripheral surface 22 of the core tube 12 with the first reinforcing layer 14 in the percent ranges described in detail above. The first reinforcing layer 14 can be disposed about the outer peripheral surface 22 of the core tube 12 by braiding the fiber over the core tube 12 at the specifications, e.g., ranges of the first braid angle $\theta_1$, described in detail above.

The step of disposing the second reinforcing layer 16 about the first reinforcing layer 14 can be further defined as covering a certain percentage of the first reinforcing layer 14 with the second reinforcing layer 16 in the percent ranges described in detail above. The second reinforcing layer 16 can be disposed about the outer peripheral surface 22 of the core tube 12 by braiding the fibers over the first reinforcing at the specifications, e.g., ranges of the second braid angle $\theta_2$, described in detail above.

The method also includes the steps of applying the binder composition 30 to the exterior surface 26 of the second reinforcing layer 16 after the second reinforcing layer 16 is disposed about the first reinforcing layer 14, infusing the binder composition 30 through the second apertures 28 to contact the first reinforcing layer 14, and infusing the binder composition 30 through the first apertures 24 to contact the outer peripheral surface 22 of the core tube 12. FIG. 2D shows the binder composition 30 infused through the second apertures 28 of the second reinforcing layer 16 to contact the first reinforcing layer 14. Whereas FIG. 2E shows the binder composition 30 infused through the first apertures 24 of the first reinforcing layer 14 to contact the outer peripheral surface 22 of the core tube 12.

In one embodiment, the binder composition 30 is applied to the partially constructed hose assembly 10 by passing the hose assembly 10 through a reservoir (not shown) containing the binder composition 30. Alternatively, the binder composition 30 can be sprayed or brushed on the hose assembly 10.

The braid configuration of the first and second reinforcing layers 12, 14, facilitates infusion of the binder composition 30 through the second apertures 28 to contact the first reinforcing layer 14 and infusion of the binder composition 30 through the first apertures 24 to contact the outer peripheral surface 22 of the core tube 12. In addition, the physical and chemical properties of the binder composition 30 promote homogenous penetration and maximum wet out of the binder composition 30 throughout the fibers, the second apertures 28 and on the exterior surface 26 of the second reinforcing layer 16, throughout the fibers and the first apertures 24 of the first reinforcing layer 14, and on the outer peripheral surface 22 of the core tube 12. The method of the present invention therefore allows for a single efficient application of the binder composition 30.

The method also includes the step of heating the binder composition 30 to form the polymeric binder 18 on the outer peripheral surface 22 of the core tube 12, in the first and second apertures 28, and about the exterior surface 26 of the second reinforcing layer 16 to bond the first and second reinforcing layers 12, 14 to the core tube 12 to form the hose assembly 10. The binder composition 30 is heated to remove the fluidic carrier and further cure the polymer, e.g., fluoropolymer, of the binder composition 30. FIG. 2F shows the polymeric binder 18 formed by heating the binder composition 30.

The step of heating the binder composition 30 to form the polymeric binder 18 is typically conducted at a temperature of from about 612 to about 800, more typically from about 650 to about 700, and most typically from about 675 to about 690, ° F. The amount of time for which the binder composition 30 is heated depends on the temperature at which the polymeric binder 18 is heated. Further, various embodiments of the binder composition 30 can require exposure to various temperatures for various periods of time to form the polymeric binder 18. In a typical embodiment the binder composition 30 is heated to the temperature of about 675° F. for about 1 minute.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims, the present invention may be practiced otherwise than as specifically described.

What is claimed is:

1. A hose assembly comprising:
    a core tube having an outer peripheral surface and comprising a fluoropolymer;
    a first reinforcing layer disposed about said core tube and defining a plurality of first apertures and having an outer peripheral surface, said first reinforcing layer covering greater than about 90% of said outer peripheral surface of said core tube and said plurality of first apertures defines less than about 10% of said outer peripheral surface of said core tube;
    a second reinforcing layer disposed about said first reinforcing layer and having an exterior surface and defining a plurality of second apertures, said second reinforcing layer covering of from about 60 to about 90% of said outer peripheral surface of said first reinforcing layer and said plurality of second apertures defines of from about 40 to about 10% of said outer peripheral surface of said first reinforcing layer; and
    a polymeric binder on said outer peripheral surface of said core tube, in said first and second apertures, and about said exterior surface of said second reinforcing layer to bond said first and second reinforcing layers to said core tube to form said hose assembly.

2. A hose assembly as set forth in claim 1 wherein said first reinforcing layer comprises a fiber.

3. A hose assembly as set forth in claim 2 wherein said first reinforcing layer comprises said fiber in a braided configuration at a first braid angle.

4. A hose assembly as set forth in claim 3 wherein said second reinforcing layer comprises a fiber.

5. A hose assembly as set forth in claim 4 wherein said second reinforcing layer comprises said fiber in a braided configuration at a second braid angle that is less than the first braid angle.

6. A hose assembly as set forth in claim 1 wherein said polymeric binder has a flexural modulus of from about 40 to about 170 kpsi in accordance with ASTM D 790.

7. A hose assembly as set forth in claim 1 wherein said polymeric binder comprises a surfactant.

8. A hose assembly as set forth in claim 7 wherein said surfactant is a non-ionic surfactant.

9. A hose assembly as set forth in claim 1 wherein said first reinforcing layer comprises fiber braided at a first braid angle of from about 54 to about 60 degrees and said second reinforcing layer comprises fiber braided at a second braid angle of from about 45 to about 54.7 degrees.

10. A hose assembly as set forth in claim 1 wherein said first reinforcing layer comprises fiberglass.

11. A hose assembly as set forth in claim 1 wherein said second reinforcing layer comprises fiberglass.

12. A hose assembly as set forth in claim 1 wherein said polymeric binder is formed from a binder composition having a viscosity of from about 30 to about 100 cps at 25° C. in accordance with ASTM D 4441.

* * * * *